(12) United States Patent
Rosenthal

(10) Patent No.: US 8,955,359 B2
(45) Date of Patent: Feb. 17, 2015

(54) METHOD AND APPARATUS FOR FEEDING PREHEATERS FOR GLASS MELTING INSTALLATIONS

(75) Inventor: Jens Rosenthal, Erkelenz (DE)

(73) Assignee: Beteiligungen Sorg GmbH & Co. KG, Lohr am Main (DE)

( * ) Notice: Subject to any disclaimer, the term of this patent is extended or adjusted under 35 U.S.C. 154(b) by 247 days.

(21) Appl. No.: 13/581,421

(22) PCT Filed: May 31, 2011

(86) PCT No.: PCT/EP2011/002678
§ 371 (c)(1),
(2), (4) Date: Aug. 27, 2012

(87) PCT Pub. No.: WO2011/154106
PCT Pub. Date: Dec. 15, 2011

(65) Prior Publication Data
US 2013/0180287 A1    Jul. 18, 2013

(30) Foreign Application Priority Data

Jun. 8, 2010   (DE) .......................... 10 2010 023 018

(51) Int. Cl.
*C03B 1/00*     (2006.01)
*C03B 3/02*     (2006.01)
*F28D 7/16*     (2006.01)
(Continued)

(52) U.S. Cl.
CPC ............... *C03B 3/023* (2013.01); *F28D 7/1615* (2013.01); *F28D 2021/0045* (2013.01); *F28F 1/04* (2013.01); *F28F 9/026* (2013.01); *F28F 27/02* (2013.01)

USPC .......................................... 65/136.1; 65/29.16

(58) Field of Classification Search
CPC .................................. C03B 3/00; C03B 3/023
USPC ................... 65/29.16, 135.9, 136.1
See application file for complete search history.

(56) References Cited

U.S. PATENT DOCUMENTS 2,593,535 A * 4/1952 Cannon, Jr. ................... 414/301
2,615,703 A * 10/1952 Weber ........................... 432/215
(Continued)

FOREIGN PATENT DOCUMENTS

DE            32 17 414         7/1983
DE      10 2008 030 161         7/2009
(Continued)

*Primary Examiner* — Jason L Lazorcik
(74) *Attorney, Agent, or Firm* — Greer, Burns & Crain Ltd.

(57) ABSTRACT

A method and an apparatus for feeding preheaters having heating elements for the feedstock of glass melting installations. In order to distribute the feedstock in an extremely thin, but uniform layer thickness on and between the upper heating elements, thereby effectively suppressing or avoiding agglutination of particles and accumulation of the feedstock, a distributor device is arranged above the topmost heating elements including at least three pivotable distributor plates, the pivoting axes of which run in the horizontal edges of a virtual prism. The topmost distributor plate throws the feedstock alternately onto one of the distributor plates arranged underneath, which throws the caught feedstock to one of its sides sternwards. The movements of the distributor plates are controlled by sensors with an evaluation and control circuit and actuators assigned to the distributor plates with the aim of a uniform area distribution of the feedstock over the cross section of the preheater.

8 Claims, 3 Drawing Sheets

Figure 1:
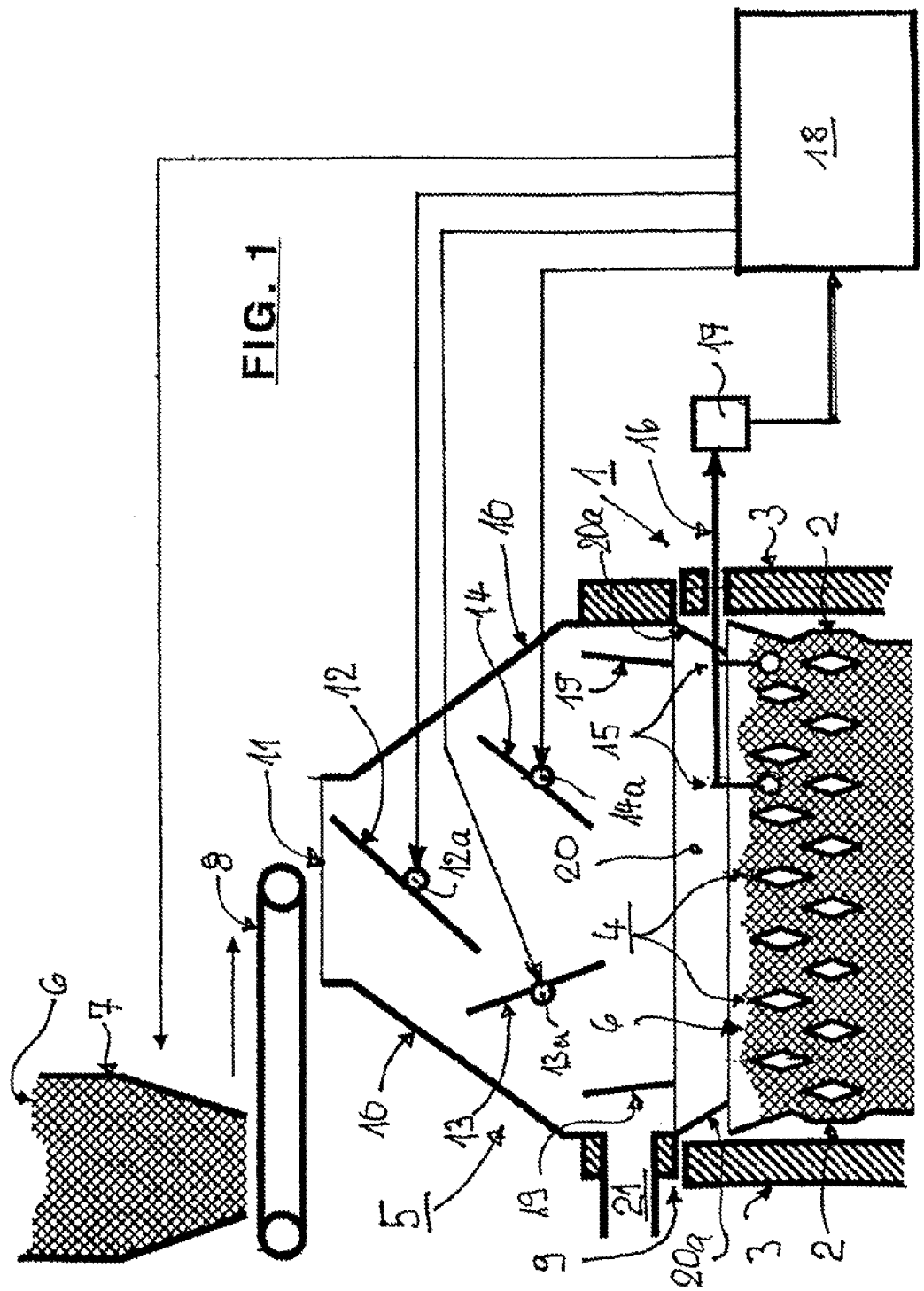

(51) Int. Cl.
*F28D 21/00* (2006.01)
*F28F 1/04* (2006.01)
*F28F 9/02* (2006.01)
*F28F 27/02* (2006.01)

(56) References Cited

U.S. PATENT DOCUMENTS

| | | | | |
|---|---|---|---|---|
| 2,658,743 | A | * | 11/1953 | Speil et al. ............ 432/98 |
| 2,926,458 | A | * | 3/1960 | Lauck ............ 65/146 |
| 3,172,648 | A | * | 3/1965 | Brichard ............ 432/5 |
| 4,019,888 | A | * | 4/1977 | Verhappen et al. ......... 65/134.5 |
| 4,248,616 | A | * | 2/1981 | Seng et al. ............ 65/335 |
| 4,252,485 | A | * | 2/1981 | Propster ............ 414/160 |
| 4,323,384 | A | * | 4/1982 | Meunier ............ 65/335 |
| 4,330,313 | A | * | 5/1982 | Hohman et al. ............ 65/482 |
| 7,494,948 | B2 | | 2/2009 | Stanley |
| 2013/0186149 | A1 | * | 7/2013 | Hansen et al. ............ 65/470 |

FOREIGN PATENT DOCUMENTS

| | | |
|---|---|---|
| EP | 1123903 | 8/2001 |
| JP | 2001355009 | 12/2001 |

* cited by examiner

METHOD AND APPARATUS FOR FEEDING PREHEATERS FOR GLASS MELTING INSTALLATIONS

BACKGROUND OF THE INVENTION

The present invention relates to a method for feeding preheaters having heating elements for the feed material of glass melting installations, the feed material being applied to the uppermost heating elements with a uniform distribution, in a manner controlled by sensors.

Reports concerning the preparation of feed material for glass melting installations have been published for decades, in many cases addressing the tendency of mixtures having different components to become glued together. The mixtures are provided for glass melting for very different purposes. The causes of the tendency of the components to become glued together are manifold, and are due to their very different melting points, viscosities, particle sizes and shapes, and to thermal and mechanical influences on the transport path before the melting. Particularly disturbing here is free or bound water carried along in the feed material, as well as water vapor introduced with the exhaust gases from the downstream melt pan for heating and heat recuperation. The condensation of evaporated water contributes enormously to the tendency towards gluing together. A further disturbing effect is a tower of feed material that builds up, in an uncontrolled and non-uniform manner, above the uppermost heating lines, and in which water vapor in turn condenses.

From U.S. Pat. No. 7,494,948 B2, it is known either to store free-flowing feed quantities of glass components for glass melting ovens in the moist state at temperatures below 35° C. or to preheat them to temperatures of 100° C. or higher before supplying them to a glass melting oven. The moist feed material should contain a free water portion of from 2% to 10% and a portion of from 0.0001% to 5% of a surface-active material, preferably a water-soluble soap such as a carboxylate having 4 to 22 bound C atoms, The moist feed material can be stored and preheated to at least 150° C., and remains free-flowing without depositing. The author states that before this invention it was not possible to feed a preheater with moist feed material because at temperatures of 100° C. and higher a baking of the compound was unavoidable. The document says nothing about the particle size, but, referring to EP 11 23 903 A2, states that without a device described there having an electrostatic dust separator, fine dust particles caused environmental pollution.

From DE 10 2008 030 161 B3, a shaft-type heat exchanger is known for preheating particulate glass mixture for glass melting ovens, through which smoke gases from the oven heating are conducted in alternating and meandering horizontal smoke gas channels. The heat exchanger has numerous vertical melt material channels that are rectangular in cross-section and that intersect, staggered transversely, with the smoke gas channels and are connected to one another by openings in the channel walls in a manner intended to suction water vapor from the vertical melt material channels in the transverse direction and to prevent the entry of smoke gases into the melt material channels. However, it cannot be excluded that, due to the distances between the stated openings in the shaft walls and due to the long horizontal flow paths in the melt material, moisture will remain therein, causing gluing together of the particles of the melt material and blockage of the supply.

None of the named documents addresses the problem of distributing the feed material uniformly and in as thin a layer as possible on or over the uppermost heating gas channels, and maintaining this state.

SUMMARY OF THE INVENTION

The object of the present invention is to indicate a method of the type described above that achieves the object of distributing the feed material on and between the upper heating elements in an extremely thin but uniform layer thickness, so that a gluing together of particles and blockage of the feed material is effectively suppressed or prevented.

In the method indicated above, the indicated object is achieved according to the present invention in that:
a) above the uppermost heating elements there is situated a distributor device having at least three pivotable distributor plates whose pivot axes run in the horizontal edges of a virtual prism (P),
b) the uppermost distributor plate throwing the feed material in alternating fashion onto one of the distributor plates situated thereunder, which then in turn throws the received feed material toward one of its sides downward, and
c) the movements of the distributor plates being controlled by sensors having an evaluation and control circuit and having actuating elements assigned to the distributor plates, so as to achieve a uniform surface distribution of the feed material over the cross-section of the preheater.

In this way, the problem posed is solved in its full scope, namely the distribution of the feed material in an extremely thin but uniform layer thickness on and between the upper heating elements, so that a gluing together of the particles, and blockage of the feed material, are effectively suppressed or prevented.

The present invention also relates to a device for feeding preheaters having a distributor device and having heating elements for the feed material of glass melting installations, the feed material being applied onto the uppermost heating elements with a uniform distribution in a manner controlled by sensors.

In order to achieve the same object and advantages, such a device is characterized in that
a) above the uppermost heating elements there is situated a distributor device having at least three pivotable distributor plates whose pivot axes run in the horizontal edges of a virtual prism (P),
b) the uppermost distributor plate being pivotable between two end positions in which the feed material can be thrown onto one of the distributor plates situated thereunder, by which the received feed material can be thrown toward one of its sides downward, and
c) the movements of the distributor plates being controllable by sensors having an evaluation and control circuit and having actuating elements assigned to the distributor plates in order to achieve a uniform surface distribution of the feed material over the cross-section of the preheater.

In further embodiments of the present invention, it is particularly advantageous if, either individually or in combination,
the uppermost axis is situated in the vertical midplane (M-M) of the distributor device, and thereunder are situated two further axes having their distributor plates disposed in a mirror-symmetrical configuration on both sides of the vertical midplane (M-M) of the distributor device, the glide path of two distributor plates oriented to one another so as to be aligned is limited in each case by a deflecting plate situated in the edge area of the distributor device, the sensors are disposed in a horizontal matrix configuration situated in a horizontal plane at the upper end of the preheater, the sensors extend into intermediate spaces between the uppermost heating elements, and/or the distributor device has, in a mirror-symmetrical configuration, two angled walls whose virtual extensions intersect one another in the midplane (M-M).

BRIEF DESCRIPTION FO THE DRAWINGS

In the following, an exemplary embodiment of the subject matter of the present invention, and of its manner of operation and further advantages, is explained in more detail on the basis of FIGS. 1 through 5.

Figure 2:
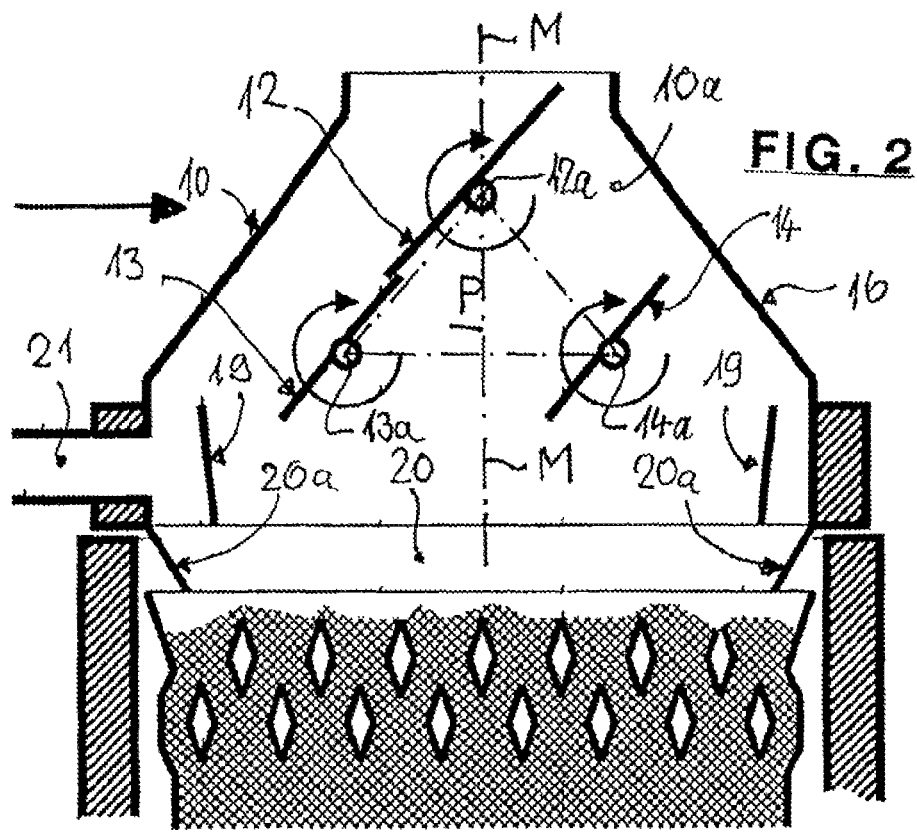
Figure 3:
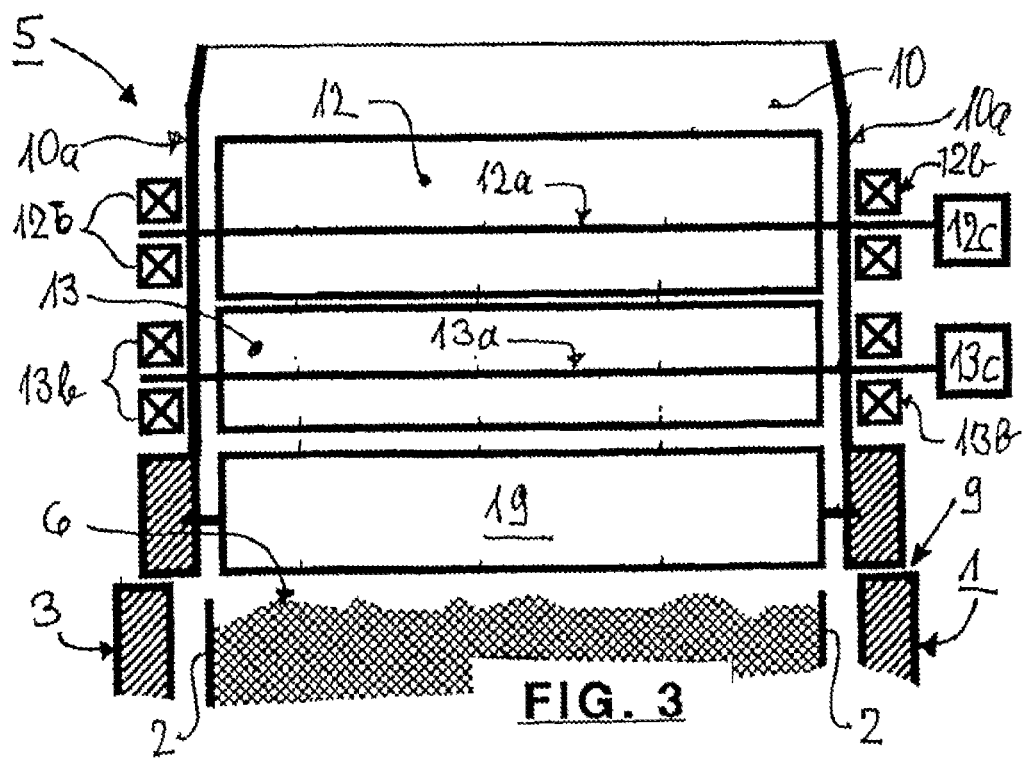
Figure 4:
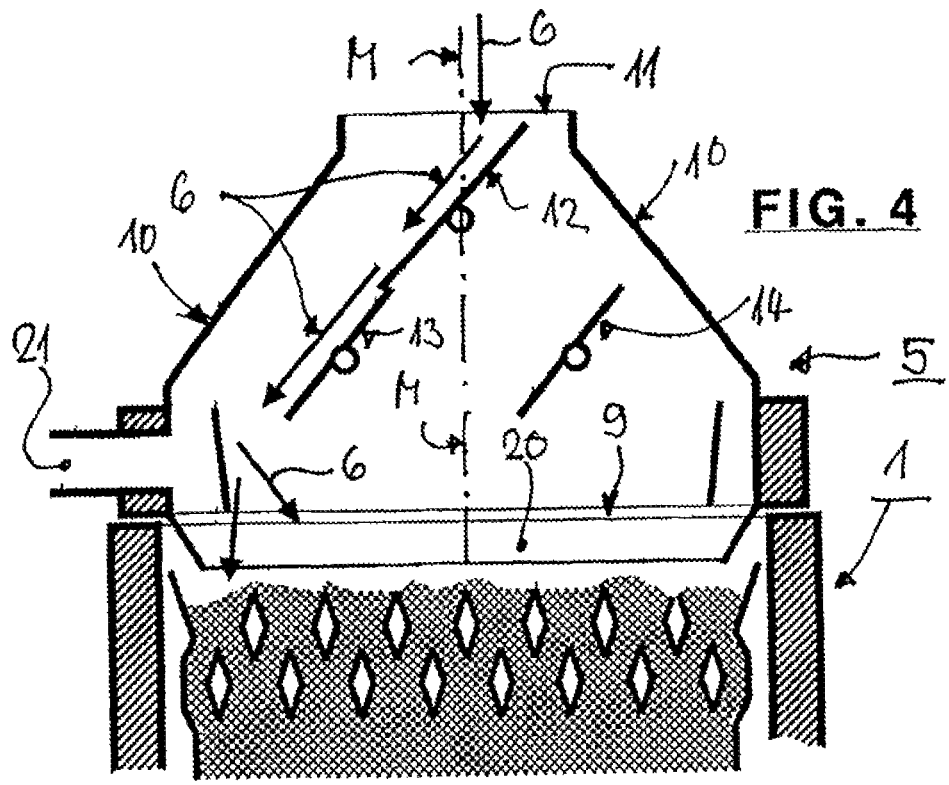
Figure 5:
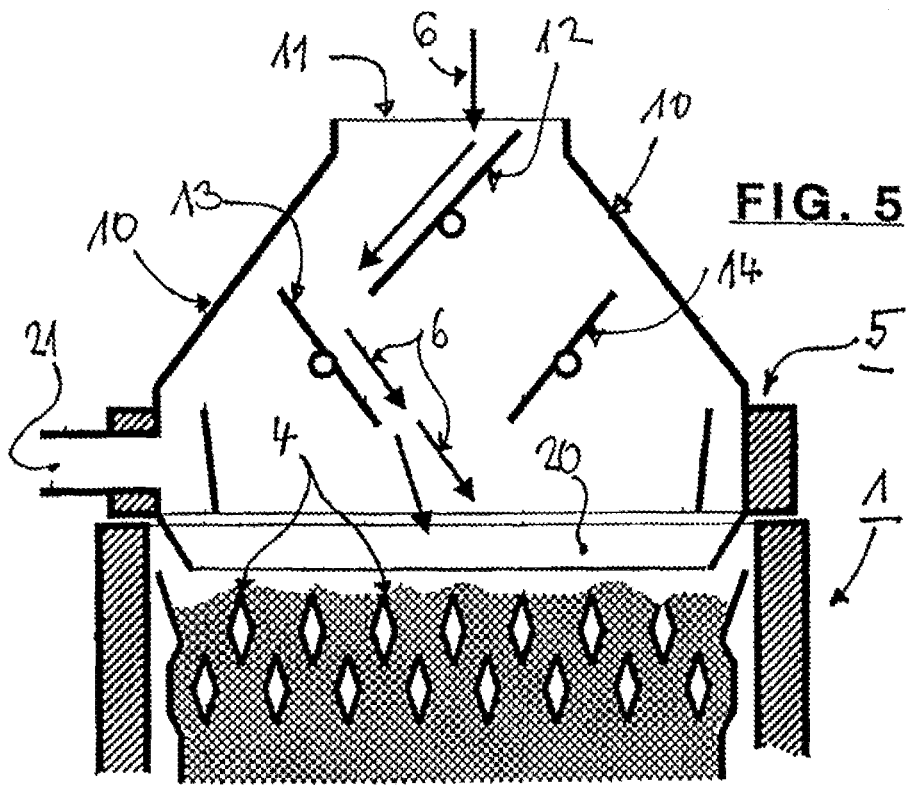

FIG. 1 shows a vertical section through the upper end of a preheater and through a distributor device for the feed material in connection with the measurement and control devices, FIG. 2 shows a section analogous to FIG. 1 for demonstrating the movement of the distributor plates, FIG. 3 shows a side view of the subject matter of FIG. 2, omitting the front roof surface, FIG. 4 shows a representation analogous to FIG. 2, with feed direction in the vicinity of the left edge, and FIG. 5 shows a representation analogous to FIG. 2, with feed direction in the center of the device.

DETAILED DESCRIPTION OF THE PREFERRED EMBODIMENTS

FIG. 1 shows a vertical section through the upper end of a preheater 1 having guide walls 2, heat insulation 3, and two tiers of heating elements 4, above which is situated a distributor device 5 for the feed material 6 that is supplied from above from a silo 7 via a transport belt 8, with broad surface distribution. Preheater 1 and distributor device 5 contact one another with rectangular cross-sections at a joint 9. Distributor device 5 has two angled roof surfaces 10 that at their upper ends enclose a rectangular feed opening 11 between them.

Inside distributor device 5 there are situated three pivotable distributor plates 12, 13, and 14, whose axes 12a, 13a, and 14a run on the horizontal edges of a virtual prism P (FIG. 2), inside feed material 6, and between heating elements 4, there is situated a flat matrix of sensors 15, of which only two are shown here. The signals of said sensors are supplied via individual lines 16 to a collection point 17, and from there are supplied to a regulating device 18 for the spatial adjustment of distributor plates 12, 13, and 14. Inside distributor device 5 there are also situated two deflecting plates 19 that are intended to prevent feed material 6 from penetrating into the intermediate space between guide walls 2 and heat insulation 3.

Terminating downward, in the region of joint 9 there is situated a rectangular frame 20 made up of angled surfaces 20a, which is provided for the same purpose. The exhaust gases flowing up from feed material 6 are conducted away by an outlet line 21.

FIG. 2 shows virtual prism P on whose horizontal edges are situated axes 12a, 13a, and 14a of distributor plates 12, 13, and 14. Their pivot movements are indicated by circular arrows. In this case, two longitudinal edges of distributor plates 12 and 13 overlap. The action is depicted in FIG. 4.

FIG. 3 shows a side view of the subject matter of FIG. 2 in the direction of the arrow, omitting front roof surface 10. These roof surfaces are connected at both ends by end faces 10a to which there are fastened bearings 12b and 13b for pivot axes 12a and 13a. They are driven by actuating elements 12c and 13c, which are controlled by regulating device 18 (FIG. 1). Of course, the same holds analogously for pivot axis 14a.

The upper part of FIG. 4 shows a representation analogous to FIG. 2, with feed direction in the vicinity of the left edge of preheater 1, and FIG. 5 shows a representation analogous to FIG. 2, with feed direction in the center of preheater 1. If midplane M-M in FIG. 4 is regarded mirror-symmetrically, there results a feed direction in the vicinity of the right edge of preheater 1.

The subject matter of the present invention creates, through its cascading configuration, an excellent precondition for the distribution of feed material 6 in an extremely thin but uniform layer thickness and between upper heating elements 4, so that a gluing together of particles and blockage of feed material 6 is effectively suppressed or prevented.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE CHARACTERS 1 preheater
2 guide walls
3 heat insulation
4 heating elements
5 distributor device
6 feed material
7 silo
8 transport belt
9 joint
10 roof surfaces
10a end faces
11 feed opening
12 distributor plate
12a pivot axis
12b bearing
12c actuating element
13 distributor plate
13a pivot axis
13b bearing
13c actuating element
14 distributor plate
14a pivot axis
15 sensors
16 lines
17 collection point
18 regulating device
19 deflecting plates
20 frame
20a angled surfaces
21 exit line
M-M midplane
P prism

The invention claimed is:
1. A method for feeding preheaters having heating elements for the feed material of glass melting installations, the feed material being applied in a uniform distribution onto the uppermost heating elements, in a manner controlled by sensors, comprising the steps:
- a) arranging a distributor device including at least three pivotable distributor plates, with an uppermost distributor plate arranged above two lower distributor plates, pivot axes of each of the distributor plates running in horizontal edges of a virtual prism, above the uppermost heating elements,
- b) throwing the feed material by the uppermost distributor plate in alternating fashion onto one of the lower distributor plates situated thereunder, by selected rotational movement of the upper distributor plate, the receiving lower distributor plate then in turn throwing the received feed material downwardly toward one of its sides by selected rotational movement of the lower distributor plate, and
- (c) controlling the movements of the distributor plates by sensors having an evaluation and control circuit, the evaluation and control circuit controlling actuating elements assigned to the distributor plates, so as to achieve a uniform surface distribution of the feed material over a cross-section of the preheater.

2. A device for feeding preheaters having a distributor device and having heating elements for the feed material of glass melting installations, the feed material being capable of being applied onto the uppermost heating elements in a uniform distribution, in a manner controlled by sensors, comprising:
- a) a distributor device situated above the uppermost heating elements having at least three pivotable distributor plates whose pivot axes run in the horizontal edges of a virtual prism, including an uppermost distributor plate and two lower distributor plates,
- b) the uppermost distributor plate being pivotable in alternating fashion between two end positions in which the feed material can be thrown onto one of the distributor plates situated thereunder, by which the received feed material can be thrown downwardly toward one of its sides, and
- (c) sensors arranged to sense the feed material and provide signals to an evaluation and control circuit with actuating elements controlled by the evaluation and control circuit which are arranged to pivot the distributor plates in order to achieve a uniform surface distribution of the feed material over the cross-section of the preheater.

3. The device as recited in claim 2, wherein the axis of the uppermost distributor plate is situated in the vertical midplane of the distributor device, and thereunder are situated two further axes of the lower distributor plates disposed in a mirror-symmetrical configuration on both sides of the vertical midplane of the distributor device.

4. The device as recited in claim 3, wherein a glide path of the two lower distributor plates is limited in each case by a deflecting plate situated in a peripheral edge area of the distributor device.

5. The device as recited in claim 2, wherein the sensors are situated in a horizontal matrix configuration that is situated in a horizontal plane at an upper end of the preheater.

6. The device as recited in claim 2, wherein the sensors extend into intermediate spaces between the uppermost heating elements.

7. The device as recited in claim 2, wherein the distributor device has, in a mirror-symmetrical configuration, two angled roof surfaces whose virtual prolongations intersect in a midplane of the distributor device.

8. A method for feeding preheaters having heating elements for the feed material of glass melting installations, comprising the steps:
- a) supplying a feed material from above onto an uppermost pivotable distributor plate having a horizontal pivoting axis,
- b) selectively rotating the uppermost distributor plate about the horizontal pivoting axis to cause the feed material to slide on the uppermost pivotable distributor plate downwardly alternately onto one of at least two lower pivotable distributor plates, each having a horizontal pivoting axis,
- c) selectively rotating the lower pivotable distributor plates about their horizontal pivoting axes to cause the feed material to slide on the lower pivotable distributor plates downwardly toward the preheater, and
- d) controlling the pivotal movements of the distributor plates by sensors arranged to sense the feed material and having an evaluation and control circuit, the evaluation and control circuit controlling actuating elements assigned to the distributor plates and arranged to selectively pivot the distributor plates, so as to achieve a uniform surface distribution of the feed material over a cross-section of the preheater.

\* \* \* \* \*